United States Patent [19]

Stephens

[11] 4,438,825
[45] Mar. 27, 1984

[54] CAB PITCH RESTRAINT

[75] Inventor: Donald L. Stephens, King County, Wash.

[73] Assignee: PACCAR Inc., Bellevue, Wash.

[21] Appl. No.: 395,613

[22] Filed: Jul. 6, 1982

[51] Int. Cl.³ .............................................. B62D 33/06
[52] U.S. Cl. .................................. 180/89.12; 280/781; 280/790; 296/190
[58] Field of Search ............... 180/89.12, 89.13, 89.14, 180/89.15; 280/790, 781; 296/190

[56] References Cited

U.S. PATENT DOCUMENTS

| 710,809 | 10/1902 | Schmid | 180/89.14 |
|---|---|---|---|
| 1,071,335 | 8/1913 | Pembroke | 180/89.14 |
| 3,554,596 | 1/1971 | Le Fevre | 296/190 |
| 3,944,017 | 3/1976 | Foster | 296/190 |
| 3,966,009 | 6/1976 | Meacock et al. | 296/190 |

Primary Examiner—Joseph F. Peters, Jr.
Assistant Examiner—Kenneth R. Rice
Attorney, Agent, or Firm—Seed and Berry

[57] ABSTRACT

A cab suspension system having a cab rail intermediate the cab and the frame rails. The cab rail is suspended above the frame rail from two points of equal deflection on the frame rail, thus reducing fore-aft pitching which would otherwise result were the cab mounted directly to the frame rail.

6 Claims, 4 Drawing Figures

CAB PITCH RESTRAINT

DESCRIPTION

1. Technical Field

This invention relates to an improved suspension system for truck cabs, and more particularly, to an improved means for mounting a truck cab on the frame rails of a truck chassis.

2. Background Art

A standard truck chassis generally includes a pair of beams which extend lengthwise along each side of the chassis and serve as the primary front-to-rear support members. These beams, known as "frame rails," are supported from below by a plurality of wheels mounted on a single front axle and usually a pair of rear axles.

Mounted on top of the truck chassis is a plurality of truck components, including the vehicle cab, the sleeper compartment (if any), the truck engine, the fuel tanks, and a fifth wheel. The fifth wheel serves as a connection between the truck and a trailer to be towed by the truck. Each of these components will transfer a downward load to the frame rails and deflect them downwardly between the front and rear axles. The deflected shape of the frame rails will remain generally the same, although the magnitude of the deflections will vary with the magnitude of the applied loads.

In addition to the loads applied by the truck and trailer, the truck chassis will also receive random loads from the roadway when the truck is in motion. These random road loads will result in further deflection of the frame rails in generally the same deflected shape as that caused by the truck and trailer loads.

Conventional truck cabs are mounted directly to the frame rails at longitudinally spaced-apart locations and at differing vertical deflection points on the deflection curve. As a result of this arrangement, the truck cabs are often inclined due to the deflection of the cab rails. For example, if the front of the cab is mounted on the frame rails at one point along the frame rails, and the rear end of the cab is mounted to the frame rails at a second point along the frame rails, the first point being relatively nearer to a supporting axle than the second point, the frame rails will deflect more at the second point than at the first point and the cab will be inclined rearwardly. When the frame rails further deflect due to random road loads, the incremental deflection at the second point will similarly be greater than the incremental deflection at the first point.

Thus, as the truck chassis experiences continuing random road loads, the cab will oscillate as the frame rails deflect. As the oscillation near the rear of the cab will be of greater magnitude than that at the front of the cab, the cab will act as if it were pivoting about the front of the cab. This pivoting phenomenon, known as "fore-aft pitching," results in an uneven ride, which will cause discomfort and increased fatigue to the truck operator. If a sleeper compartment is mounted on the frame rails rearward of the cab, pitching may be pronounced in the sleeper compartment, making it especially uncomfortable to use when the truck is in motion.

Efforts to reduce these pitching effects have concentrated primarily on developing means for connecting the cab to the frame rails which will dampen the cab oscillation or otherwise lessen the effects of pitching. For example, U.S. Pat. No. 3,944,017 discloses the use of air springs designed to lessen the pitching effect. An alternate approach is disclosed in U.S. Pat. No. 3,554,596, which discloses the use of a pivoting connection between the cab and the frame rail positioned at a point of zero deflection on the frame rail in combination with a spring connection positioned elsewhere on the frame rail.

DISCLOSURE OF THE INVENTION

It is an object of this invention to provide a means for mounting a truck cab on the frame rails of a truck chassis which will substantially reduce the fore-aft pitching of the truck cab.

It is another object of this invention to provide such a mounting means which will reduce driver fatigue and discomfort.

These and other objects of the invention, which will become more apparent as the invention is more fully described below, are obtained by providing a pair of cab rails intermediate the cab and the frame rails of the truck to isolate the truck cab and sleeper compartment (if any) from fore-aft pitching motion. The cab rails extend lengthwise along the frame rails and are connected thereto at points of equal deflection on the deflected frame rails. Thus, when the cab frame and frame rails are subjected to additional deflection, the cab and accompanying sleeper compartment will move up and down uniformly rather than deflecting more at one location along the cab than another. The cab rails, at least at one connection location, are preferably suspended above the frame rails by springs which will soften the cab ride. The cab rails are preferably sized relative to the frame rails to ensure that they do not resonate at the same frequencies.

BEST MODE FOR CARRYING OUT THE INVENTION

Figure 1:
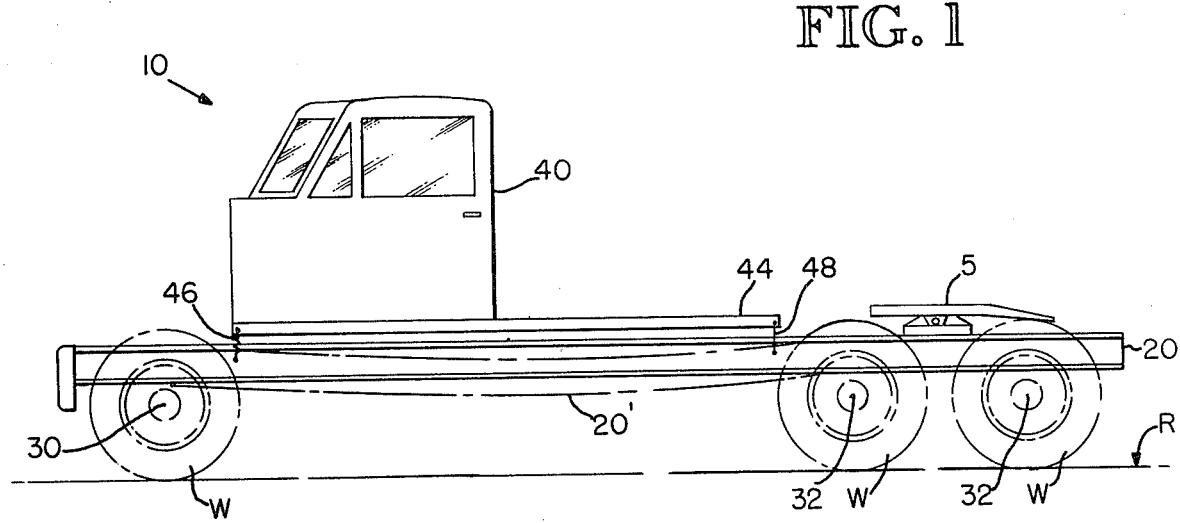
FIG. 1 is a side elevation view of an embodiment of the cab suspension system of this invention having a cab mounted on the cab rails. The deflected shape of the frame rails is shown in phantom line.

One embodiment of the cab suspension system of this invention is disclosed in FIG. 1. A truck or tractor 10 includes a pair of frame rails 20 suspended above a roadway R by wheels W mounted on a front axle 30 and a pair of rear axles 32. A fifth wheel 5 is positioned near the rear of the tractor between the two rear axles 32. The deflected shape of the frame rails 20, as a result of loads is shown by phantom line 20'. The truck cab 40 is mounted directly on a pair of cab rails 44. The cab rails are suspended above the frame rails by conventional front cushioning type connectors 46 and rear connectors 48. Front connectors 46 and rear connectors 48 are positioned along the frame rails at points of equal deflection on the deflected frame rails.

Figure 2:
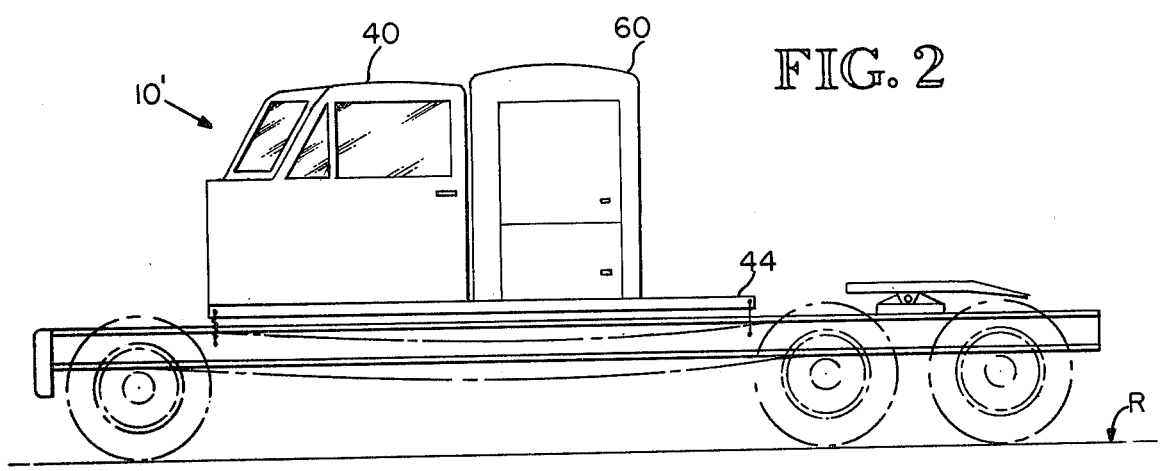
FIG. 2 is a side elevation view of an embodiment of the cab suspension system of this invention having a cab and sleeper compartment mounted on the cab rails. The deflected shape of the frame rails is shown in phantom line.

FIG. 2 illustrates an alternate embodiment of the invention, including a sleeper compartment 60 mounted on the cab rail 44 behind the cab 40. The cab rail 44 is again connected to the frame rail at points of equal deflection on the frame rail.

Figure 3A:
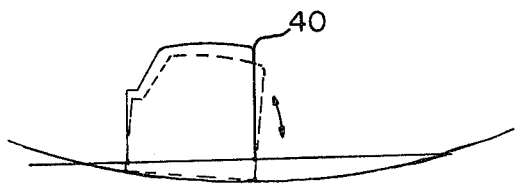
FIG. 3A is a diagram illustrating the fore-aft pitching motion of a cab mounted directly on a frame rail as is customary in the prior art.
Figure 3B:
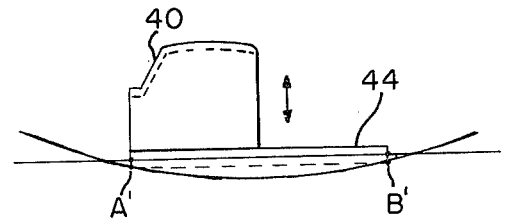
FIG. 3B is a diagram illustrating the uniform vertical motion of a cab mounted on a cab rail which is mounted to a frame rail at points of equal deflection on the frame rail.

The cab suspension system of this invention reduces fore-aft pitching by effectively mounting the cab and sleeper compartment (if any) to points of equal deflection on the frame rail. As seen in FIG. 3A, a truck cab mounted directly to a frame rail will undergo pitching because the magnitude of the deflection at the rear of the cab is greater than the vertical magnitude of the deflection at the front of the cab. As seen in FIG. 3B, the present invention reduces this phenomenon by placing the cab 40 on a cab rail 44 and attaching the cab rail 44 to the frame rail at points A' and B', having equal deflection magnitudes along the deflected shape of the frame rail. The result of this arrangement is to produce uniform vertical movement of the entire cab when subjected to additional deflection as a consequence of loads encountered when traveling on a roadway. Not only can this uniform deflection be more easily and evenly dampened, but it is less stressful on the vehicle operator, who would otherwise undergo a pitching motion along with the truck cab 40.

Although the cab suspension system of this invention has been disclosed herein with respect to two specific embodiments, many modifications of the embodiments disclosed here will be apparent to those of ordinary skill in the art as being within the spirit of this invention. It is not intended that the invention disclosed herein be limited to the specific embodiments shown herein, but rather that it encompass all such modifications as are apparent to those of ordinary skill in the art.

I claim:

1. A vehicle which comprises:
   a vehicle frame including left and right frame rails which undergo vertical deflection when under load;
   a front axle attached to the vehicle frame near the front of the vehicle frame, the front axle including a plurality of front wheels mounted thereon;
   a rear axle attached to the vehicle frame near the rear of the vehicle frame, the rear axle including a plurality of rear wheels mounted thereon;
   a pair of cab rails coupled to the frame rails at two longitudinally spaced points of substantially equal vertical deflection along the frame rails; and
   a vehicle cab mounted on the cab rails.

2. The vehicle of claim 1, wherein said vehicle is a tractor-trailer combination and including:
   a fifth wheel mounted on the vehicle frame near the rear of the vehicle frame for attaching a trailer to the vehicle frame.

3. The truck of claim 2, wherein the forward end of the cab rails is coupled to the frame rails by cushioning members for damping vertical motion of the cab rails.

4. The truck of claim 2, further including a sleeper mounted behind the cab on the cab rails.

5. The vehicle of claim 1, wherein said vehicle is a tractor and including: a fifth wheel mounted on the vehicle frame near the rear of the vehicle frame for attaching a trailer to the vehicle frame.

6. A vehicle comprising:
   a pair of longitudinal frame rails which undergo vertical motion into a deflection curve having a low point during loading;
   an operator's cab; and
   means attaching said cab to said frame rails at fore and aft spaced points along said frame rails on either side of the low point of said deflection point at points of substantially equal vertical deflection on said curve, whereby said cab fore and aft attachment results in substantially vertical movement and minimum pitching.

* * * * *